United States Patent [19]

Kanai et al.

[11] Patent Number: 4,589,696
[45] Date of Patent: May 20, 1986

[54] ADJUSTMENT/ENGAGEMENT DEVICE IN A VEHICLE SEAT

[75] Inventors: Shigeru Kanai; Masatatsu Kanai, both of Akishima, Japan

[73] Assignee: Tachikawa Spring Co., Ltd., Tokyo, Japan

[21] Appl. No.: 630,306

[22] Filed: Jul. 12, 1984

[51] Int. Cl.⁴ .................................................. A47C 3/00
[52] U.S. Cl. ....................................... 297/284; 297/356
[58] Field of Search ............................... 297/284, 356; 248/297.3; 403/105

[56] References Cited

U.S. PATENT DOCUMENTS

| | | | |
|---|---|---|---|
| 2,120,156 | 6/1938 | Simpson | 297/356 X |
| 4,370,000 | 1/1983 | Kazaoka et al. | 297/284 |
| 4,451,084 | 5/1984 | Seeley | 297/410 |

Primary Examiner—William E. Lyddane
Assistant Examiner—Peter R. Brown
Attorney, Agent, or Firm—Cushman, Darby & Cushman

[57] ABSTRACT

An adjustment/engagement device applicable to a thigh support device, a head-rest height adjustment device and the like in a vehicle seat is disclosed. In this adjustment/engagement device, a stopper bracket having a plurality of engagement grooves engageable in only one direction and provided at their both ends with engagement pieces is provided in one of a fixed-side member and a movable-side member in a movable adjustment portion of the vehicle seat, while a lock bracket engageable into the front-end-side engagement groove of the stopper bracket and movable in a separating direction after abutment against the front-end-side engagement piece of the stopper bracket as well as a lock-off bracket rotatable when abutted against the rear-end-side engagement piece of the stopper bracket are provided in the other, whereby the position of the movable-side member can be adjusted by directly operating the movable-side member itself.

6 Claims, 7 Drawing Figures

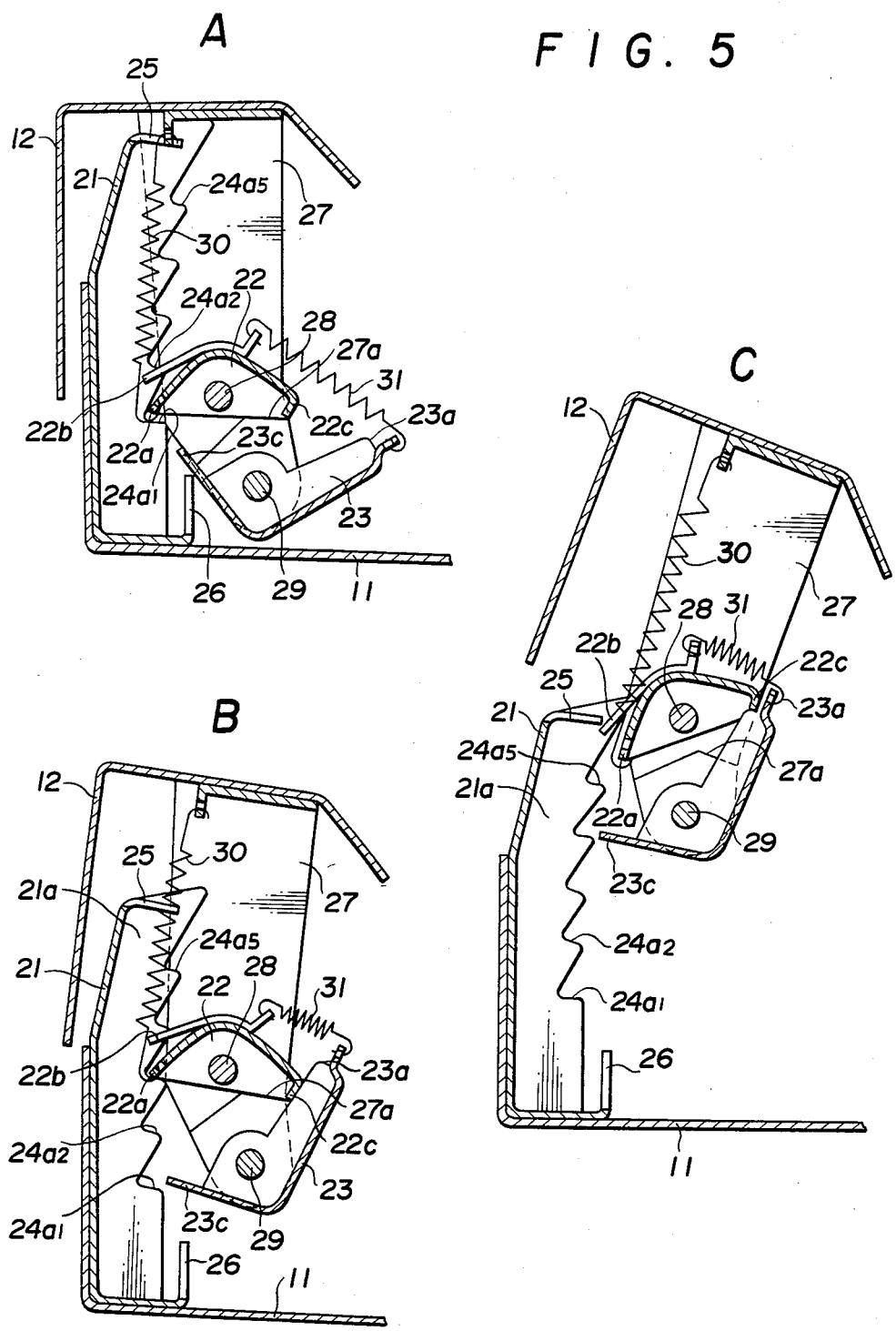

ADJUSTMENT/ENGAGEMENT DEVICE IN A VEHICLE SEAT

BACKGROUND OF THE INVENTION

1. Field of the Invention

The present invention relates to an improved adjustment/engagement device which can be applied to a rise-and-fall adjustment device in the forward portion of a seat cushion, an inclination adjustment device in the seat cushion, a tilt device in the seat cushion, or an adjustment/support device for a head-rest in a vehicle seat.

2. Description of the Prior Art

Conventionally, an adjustment/engagement device of this type is provided with an operation mechanism such as a screw mechanism, gear mechanism or cam mechanism and an operation lever mounted to the outside of a seat for operation of such operation mechanism. Such conventional adjustment/engagement device, however, is complicated in structure and also requires a large number of components due to the provision of the operation lever or the like. Further, since in operation loads applied to its members on its movable side are carried by the operation lever, the operation lever and its cooperative members must be formed strong and rigid and thus such prior art device is large in weight and expensive. In addition, as the movable-side member is operated indirectly by means of the operation lever, large operating loads are produced in the prior art device and, especially when the movable-side member comprises a forward frame portion of a seat cushion or an entire seat cushion, such prior art device can not be operated smoothly.

SUMMARY OF THE INVENTION

In view of the foregoing prior art circumstances, the present invention aims at eliminating the drawbacks seen in the above-mentioned conventional device.

Accordingly, it is a first object of the invention to provide an improved adjustment/engagement device which is capable of adjusting the position of a movable-side member simply by directly lifting up or pushing down the movable-side member provided in a movable adjustment portion of a seat cushion.

In attaining this object, according to the invention, a stopper bracket is fixed to one of a fixed-side member and a movable-side member in the movable adjustment portion, while a lock bracket and a lock-off bracket are provided in the other of the two members. The lock bracket is adapted to be sequentially engaged into engagement grooves formed in the stopper bracket. After it has passed through the forward-most engagement groove of the stopper bracket, the lock bracket is abutted against a front-end-side engagement piece and is moved in a direction separating away from the stopper bracket so as to be released from engagement. The lock-off bracket is adapted to retain the lock bracket in this engagement released state. When it is abutted against a rear-end-side engagement portion of the stopper bracket, the lock-off bracket is rotated to be free from its retaining of such released engagement of the lock bracket. Therefore, without operating any handle or operation lever as in the prior art device, the device of the invention is able to movably adjust the movable adjustment portion, which offers a highly practical advantage.

It is a second object of the invention to provide an adjustment/engagement device which permits smooth adjustment operations of the movable adjustment portion.

In order to accomplish this object, according to the invention, there is eliminated the possibility that loads for operation are centralized on one place as in the prior art device using an operation lever or the like. That is, the present device is constructed such that a whole movable member in the movable adjustment portion can be lifted up or pushed down and thus the present invention can be operated quite smoothly.

It is another object of the invention to provide an improved adjustment/engagement device which provides an improved appearance with no operation member such as an operation lever being projected externally of a seat, is simplified in structure, and is reduced in weight and cost.

To achieve this object, according to the invention, there are provided the above-mentioned stopper bracket, lock bracket and lock-off bracket within the seat and either of the stopper bracket or the lock bracket and lock-off bracket is located in the movable-side member. By lifting up or pushing down the movable-side member, the lock bracket can be engaged into a predetermined position of the stopper bracket or be separated away from the stopper bracket to release its locking condition.

These and other objects, features and advantages of the invention will become more apparent upon a reading of the following detailed specification and appended drawings.

BRIEF DESCRIPTION OF THE DRAWINGS

FIGS. 5A, B and C are sectional views respectively illustrating operation states of the main portions of the above embodiment, specifically, 5A illustrating an engaged state, 5B illustrating an engagement released state and 5C illustrating a state being switched from the engagement released state to the engaged state.

DETAILED DESCRIPTION OF A PREFERRED EMBODIMENT OF THE PRESENT INVENTION

In this specification, there is illustrated an embodiment of the invention or a so-called thigh-support adjustment device which is capable of adjustments of the height of a movable forward portion of a seat cushion forming a part of a vehicle seat.

Figure 1:
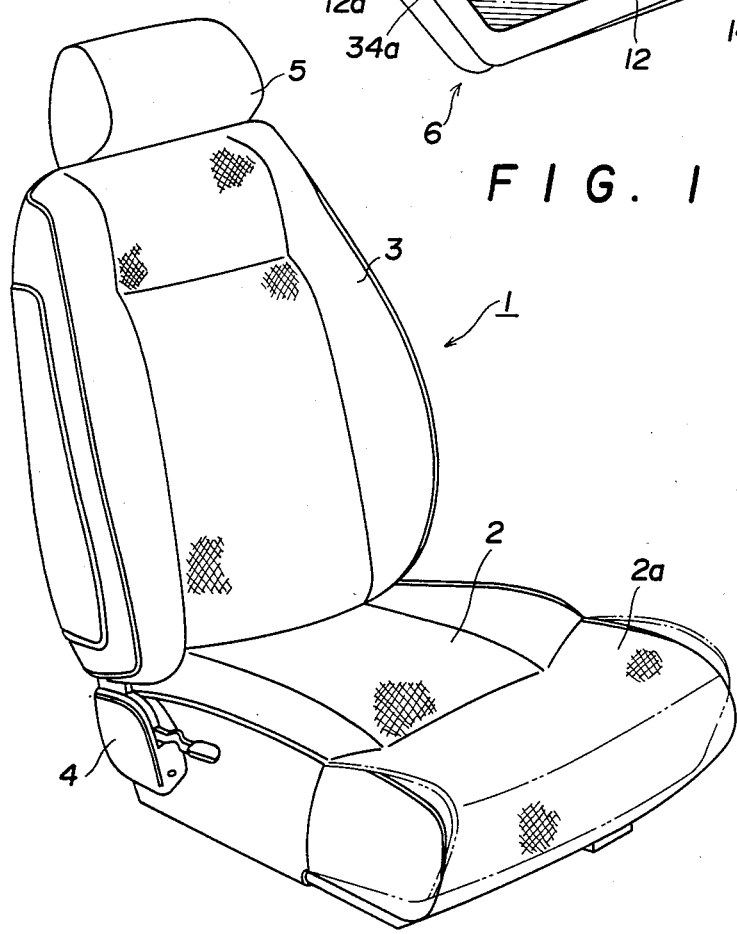
FIG. 1 is a perspective view of an entire vehicle seat incorporating in its thigh support portion an adjustment/engagement device constructed in accordance with the present invention.

In FIG. 1, there is illustrated an entire vehicle seat (1), for example, an entire automotive driver's seat. This seat (1) comprises a seat cushion (2) and a seat back (3) both of which are interconnected with each other by means of a reclining device (4). The seat (1) further includes a head-rest (5) mounted onto the top portion of the seat back (3) and an adjustment/engagement device or a thigh support adjustment device (6) of the invention provided in the forward portion of the seat cushion (2).

Figure 2:
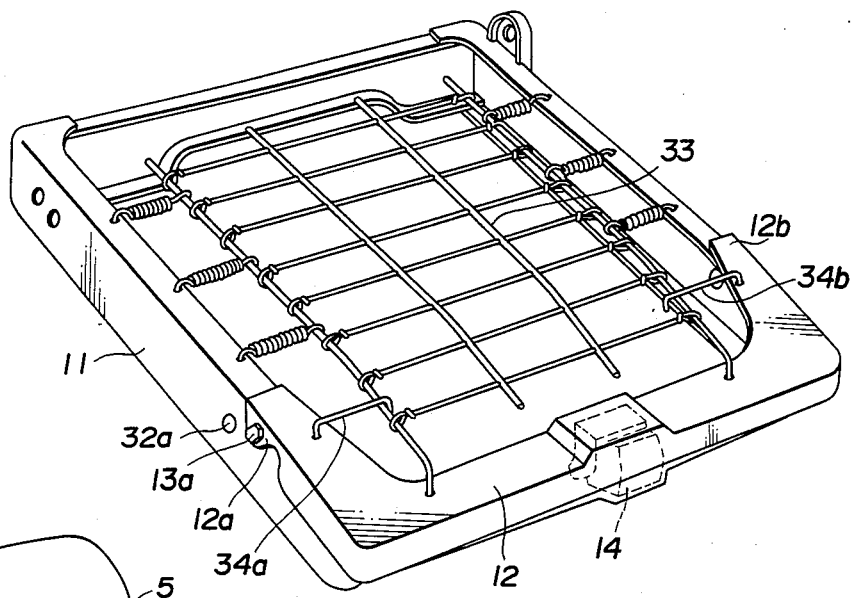
FIG. 2 is a perspective view of a cushion frame portion of the same seat.

FIG. 2 illustrates a cushion frame (11) which is provided with the thigh support adjustment device (6) of the invention (6). This thigh support adjustment device (6) is structured as follows: A movable-side member or a U-shaped movable frame (12) is provided in the forward portion of the cushion frame (11) that is a fixed-side member, with its both ends (12a) and (12b) being journaled by shaft pins (13a) and (13b) to the sides of the cushion frame (11) respectively in such a manner that they are free to rise and fall; and, an adjustment/engagement mechanism (14) is provided between the movable frame (12) and the cushion frame (11).

Figure 3:
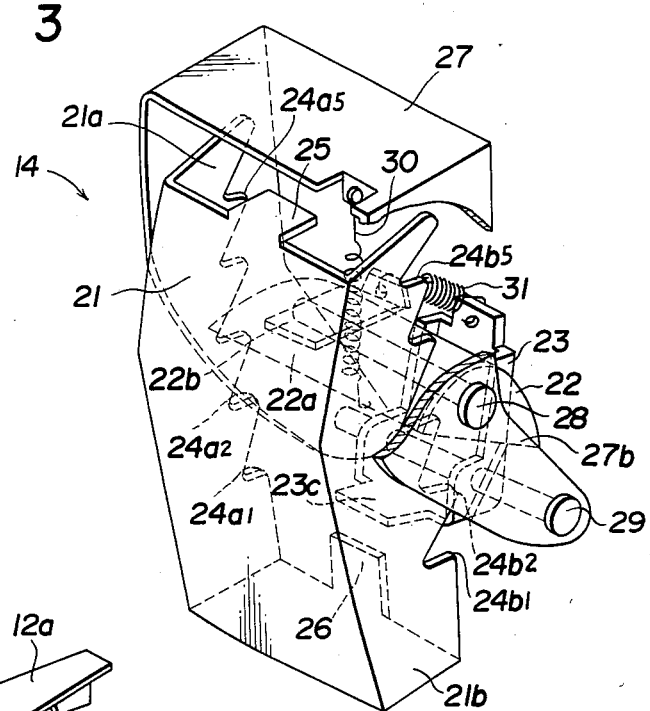
FIG. 3 is a partially cut-away perspective view of main portions of an embodiment of the invention.
Figure 4:
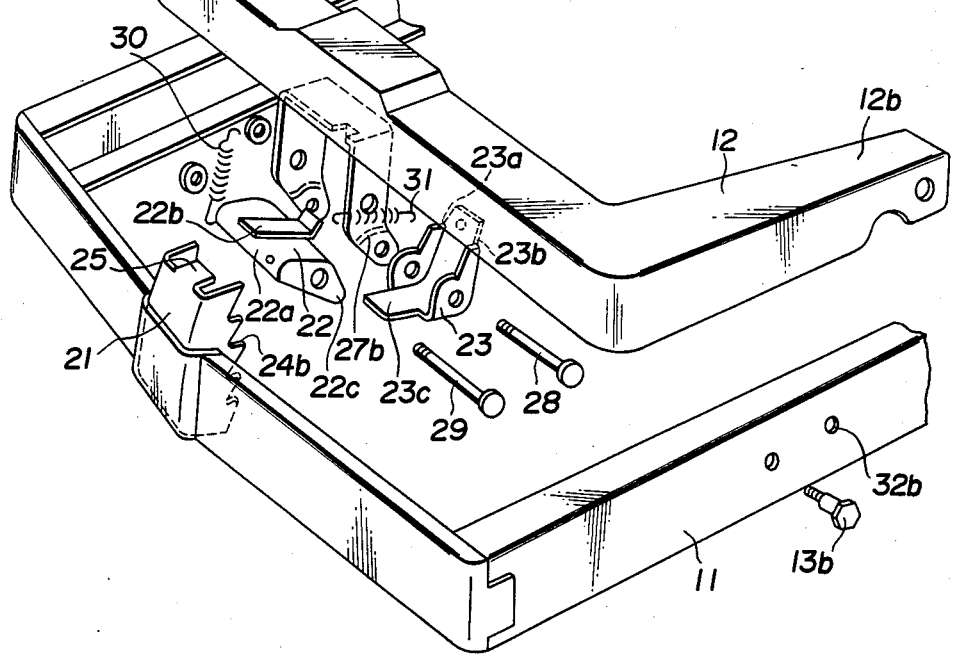
FIG. 4 is an exploded perspective view of the above embodiment.

FIGS. 3 and 4 respectively illustrate the above-mentioned thigh support adjustment device (6) wherein the adjustment/engagement mechanism (14) comprises a stopper bracket (21) fixed to the cushion frame (11) as well as a lock bracket (22) and a lock-off bracket (23) respectively mounted to the movable-side frame (12). The stopper bracket (21) includes at its both sides (21a) and (21b) a plurality of obliquely, upwardly formed engagement grooves (24a), [(24$a_1$), (24$a_2$) - - - - ] and (24b), [(24$b_1$), (24$b_2$) - - - - ] which are step-wise positioned in a vertical direction along an arc centering around the journaled portion of the movable frame (12) so as to form an internal sector gear. It is also provided with a horizontal engagement piece (25) positioned between these engagement grooves (24a) and (24b) and projected from its upper edge portion, and a vertical engagement piece (26) positioned between the engagement grooves (24a) and (24b) and projected upwardly from its lower edge portion.

Lock bracket (22) and lock-off bracket (23) are respectively journaled to an inverted U-shaped bracket (27) which is so fixed to the movable frame (12) as to be opposed to the stopper bracket (21). Specifically, the lock bracket (22), which includes an engagement edge (22a) to be engaged within the engagement grooves (24a), (24b) of the stopper bracket (21) and a projection piece (22b) to be engaged with the horizontal engagement piece (25), is journaled to the inverted U-shaped bracket (27) via a shaft pin (28), while the inverted U-shaped bracket (27) is provided in its top end portion with engagement means (27a), (27b) which allow the lock bracket (22) to be engaged substantially horizontally.

On the other hand, the lock-off bracket (23) has a substantially L-shaped configuration and includes three main portions; a bent portion, a vertical portion and a horizontal portion. The bent portion is positioned below the lock bracket (22) and is journaled by a shaft pin (29) to the top end of the inverted U-shaped bracket (27). The vertical portion is formed at its upper end with engagement portions (23a), (23b) which are engaged with the rear end (22c) of the lock bracket (22) in a below-mentioned engagement released state when the lock bracket (22) is rotated. The horizontal portion is provided at its tip end with a projection piece (23c) to be abutted against the above-mentioned vertical engagement piece (26) of the stopper bracket (21).

The lock bracket (22) is interconnected with the inverted U-shaped bracket (27) by means of a tension spring (30) in such a manner that the lock bracket (22) can be rotated in a substantially horizontal direction, that is, the rearward portion of the lock bracket (22) is normally brought into contact with the engagement portions (27a), (27b) of the inverted U-shaped bracket (27). The lock bracket (22) is also connected with the lock-off bracket (23) by means of a tension spring (31) in a manner that the rear portion of the lock bracket (22) is retentively engaged with the engagement portions (23a) and (23b) as it is opposed to them.

Rearwardly of the portion of the cushion frame (11) to journal the movable frame (12), there are provided stoppers (32a), (32b) which serve to restrict the rotation of the movable frame (12). Also, on the upper surface side of the cushion frame (11) there is provided a pad carrier (33) which is prolonged in a forward direction. It has a tip end that is engaged with the movable frame (12) and both sides of the tip end are connected to the movable frame (12) through fine wire materials (34a), (34b).

A seat pad is placed over the thus-formed upper surface ranging from the cushion frame (11) to the movable frame (12), namely, over the upper surface of the pad carrier (33) and is then covered with a top member to provide the seat cushion (2). In this case, it is preferred that the seat pad be divided into two sections respectively corresponding to the cushion frame (11) and the movable frame (12), or, alternatively, the seat pad may be formed with a folding groove which is interposed between these two frames (11) and (12).

Referring now to FIGS. 5A, B and C, we will describe the operation of the seat cushion constructed in the above-mentioned manner.

At first, while the seat cushion (2) is maintained in its flat state, that is, the forward thigh support portion (2a) of the seat cushion (2) is retained in its lowest position, the adjustment/engagement mechanism (6) is held in a state in which the tip end (22a) of the lock bracket (22) on the side of the movable frame (12) is engaged with the lower-most engagement grooves (24$a_1$), (24$b_1$) of the stopper bracket (21) on the side of the cushion frame (11), (see FIG. 5A).

Then, in order to set the thigh support portion (2a) of the seat cushion (2) at a desired height, if the thigh support portion (2a) itself is lifted up and the movable frame (12) is rotated upwardly about the journaled portion thereof via the shaft pins (13a), (13b), then the lock bracket (22), while it is moved in a upward direction along the edges of the engagement grooves (24$a_1$), (24$b_1$), is rotated about the shaft pin (28) to become engaged into the next-step engagement grooves (24$a_2$), (24$b_2$). It should be noted here that the rotational movement of the lock bracket (22) be limited within the range that the rear end (22c) thereof may not become engaged with the engagement portions (23a), (23b) of the lock-off bracket (23).

When the lock bracket (22) has been moved upward sequentially along the engagement grooves (24a), (24b) of the stopper bracket (21) with the rotational movement of the movable frame (12) and thus the thigh support portion (2a) has been lifted up to the desired height, the leading end (22a) of the lock bracket (22) is engaged into the corresponding engagement grooves (24a), (24b) of the stopper bracket (21), while the rear half section of the lock bracket (22) is brought into contact with the engagement portions (27a), (27b) of the inverted U-shaped bracket (27) fixed to the movable frame (12) and is positioned in an almost horizontal state.

In this state, when loads are applied to the thigh support portion (2a) from above to rotate the movable frame (12) downwardly about its journaled portion, the leading end (22a) of the lock bracket (22) is then engaged into the engagement grooves (24a), (24b) of the stopper bracket (21) and the rear end thereof is abutted against the engagement portions (27a), (27b) of the inverted U-shaped bracket (27) to be prevented against its further rotational movement, so that the movable frame (12) is caused to stop its downward rotation and thus the thigh support portion (2a) is now retained at the desired height (see FIG. 5B).

In this manner, the movable frame (12) can be moved rotationally in an upward direction and be locked stepwise until the lock bracket (22) is engaged into the engagement grooves (24$a_5$), (24$b_5$) in the upper-most step of the stopper bracket (21) so as to set the thigh support portion (2a) at its desired higher positions in a stepwise manner. In other words, the thigh support portion (2a), in this way, can be moved up to its desired higher positions along the number of steps of the engagement grooves (24a), (24b) formed in the stopper bracket (21) that is fixed to the cushion frame (11).

When the thigh support portion (2a) is locked in one of its higher positions and it is desired to move it from the old higher position down to a new lower position, if the thigh support portion (2a) is lifted up higher above its upper-most engagement position, or the movable frame (12) is rotated greatly in an upward direction, then the lock bracket (22) is moved upwardly higher than the level of the upper-most engagement grooves (24$a_5$), (24$b_5$) of the stopper bracket (21). This upward movement causes the projection piece (22b) of the lock bracket (22) to be engaged with the horizontal engagement piece (25) at the upper end of the stopper bracket (21), which engagement in turn causes the lock bracket (22) to be rotated against the biasing force of the tension spring (30) extended between the lock bracket (22) and the inverted U-shaped bracket (27). Consequently, the leading end (22a) of the lock bracket (22) is disengaged out of the forming edges of the engagement grooves (24a), (24b), while the rear end (22c) of the lock bracket (22) is positioned opposed to the engagement portions (23a), (23b) of the lock-off bracket (23). Accordingly, the lock-off bracket (23) is now rotated about the shaft pin (29) due to the biasing force of the tension spring (31) extended between the lock-off bracket itself and the lock bracket (22), with its engagement portions (23a), (23b) being engaged with the rear end portion (22c) of the lock bracket (22). As a result of this engagement, the lock bracket (22) is retained in such a state in which the leading end portion (22a) thereof is separated from the forming edges of the engagement grooves (24a), (24b) of the stopper bracket (21), (see FIG. 5C).

Next, in this state, if the thigh support portion (2a) is pressed down from above, then the movable frame (12) is rotated downward about its journaled portion relative to the cushion frame (11). When the movable frame (12) is rotated down to its lower-most position, the projection piece (23c) of the lock-off bracket (23) is abutted against the front end of the vertical engagement piece (26) provided in the lower edge portion of the stopper bracket (21). As a result of this, the lock-off bracket (23) is rotated about the shaft pin (29) against the biasing force of the tension spring (31) in a direction in which the upper end engagement portions (23a), (23b) thereof are separated away from the rear end portion (22c) of the lock bracket (22), so that the lock bracket (22) is now released from its retentively engaged position.

Therefore, the lock bracket (22) is now rotated by means of the biasing force of the tension spring (30) extended between the inverted U-shaped bracket (27) and the lock bracket (22) itself. As a result of this, the front end portion (22a) thereof is engaged into the lowest engagement grooves (24$a_1$), (24$b_1$) of the stopper bracket (21), while the rear half section thereof is brought into contact with the engagement portions (27a), (27b) of the inverted U-shaped bracket (27) and thus is positioned in its horizontal condition. That is, the lock bracket (22) returns to its former position as illustrated in FIG. 5A.

In this state, the thigh support portion (2a) is lifted up again to the desired height and the movable frame (12) is locked and retained relative to the cushion frame (11) by means of engagement between the stopper bracket (21) and the lock bracket (22), so that the thigh support portion (2a) can be positively set at the desired height.

Although the illustrated adjustment/engagement device has been described hereinbefore as an application to the thigh support portion of the seat, the present invention can also be applied as a head-rest height or longitudinal position adjustment/engagement device.

When the invention is applied as a head-rest height adjustment/engagement device, the adjustment/engagement mechanism (14) is arranged between a head-rest stay and a head-rest holder fixed to a back frame, while the stopper bracket (21) is mounted onto one of the head-rest stay or holder and the lock and lock-off bracket (22) and (23) are mounted onto the other. In this case, the head-rest stay is arranged to move linearly relative to the head-rest holder and thus the engagement grooves (24a), (24b) of the stopper bracket (21) are formed in a linear direction.

Also, when the invention is applied to a so-called tilt mechanism—a mechanism for inclining and adjusting the entire seat cushion—, the stopper bracket (21) is provided on the side of the floor surface of the vehicle, while the lock bracket (22) and lock-off bracket (23) are located on the side of the cushion frame.

Of course, the present invention can be further applied in the form of an adjustment/engagement device to the side support sections of the seat cushion and seat back.

As clear from the foregoing description, in the present invention, the movable-side member provided in the movable adjustment portion of the vehicle seat can be aribitrarily adjusted in position simply by directly lifting up or pushing down the movable-side member itself. As a result of this, unlike the prior art device which is operated using a handle or a knob, the present invention can be operated very smoothly without centralizing its operation loads on one place. At the same time, because of elimination of the need of such handle or knob as well as members for mounting an operation shaft for such handle or knob, the invention can decrease the number of components for simplified construction as well as reduce its weight and cost. In other words, the present invention can be applied quite effectively as an adjustment/engagement device for adjusting the height or longitudinal position of the above-mentioned thigh support portion or head-rest of the vehicle seat.

What is claimed is:

1. An adjustment/engagement device for use in a vehicle seat of the type including a fixed-position frame portion and a movable frame portion which is adjustable between raised and lowered height positions relative to said fixed-position frame portion, said device comprising:
   a stopper bracket fixed to one of said fixed-position or movable frame portions and including a spaced-apart pair of position-determining members which together define plural pairs of engagement grooves which establish said raised and lowered positions of said movable frame portion in addition to establishing at least one intermediate position thereof, and said stopper bracket also including upper and lower engagement pieces formed on upper and lower edge portions, respectively, of said stopper bracket;

an inverted U-shaped bracket fixed to the other of said fixed-position or movable frame portions in a position so as to oppose said stopper bracket, wherein said U-shaped bracket includes a spaced-apart pair of mounting arms which define a corresponding pair of engagement surfaces;

lock bracket means jornalled to and extending between said pair of mounting arms and having an engagement portion for selectively engaging with said pairs of engagement grooves to thereby maintain said movable frame portion in one of said raised, intermediate and lowered positions, said lock bracket means being pivotable between an engaged position wherein said engagement portion is engaged with one of said pairs of engagement grooves and a disengaged position wherein said engagement portion is disengaged from said pairs of engagement grooves; and lock-off bracket means also journalled to and extending between said pair of mounting legs and including means defining a lock-off surface, wherein said lock and lock-off bracket means together cooperate to retain said lock bracket means in said disengaged position in response to said lock bracket means contacting said upper engagement piece when said movable frame portion is raised beyond said raised position by virtue of interengagement between said lock bracket means and said lock-off surface thereby permitting free movement of said movable frame from said raised position to said lowered position, and to release said lock bracket means from said interengagement with said lock-off surface in response to said lock-off bracket means contacting said lower engagement piece when said movable frame portion reaches said lowered position, said lock bracket means responsively pivoting into said engaged position upon release of said interengagement with said lock-off surface to thereby cause said engagement portion to engage that one pair of engagement grooves which establishes said lowered position, and wherein said pair of engagement surfaces provide means for limiting pivotal movement of said lock means in one direction thereby establishing said engaged position of said lock bracket means by virtue of said lock bracket means coming into bearing contact with said pair of engagement surfaces upon reaching said engaged position and to thus also provide means to establish rigid interconnection between said U-shaped bracket and said support bracket when said engagement portion is engaged with one of said pairs of engagement grooves while yet permitting said lock bracket means to pivot in a second direction, opposite to said one direction, towards said disengaged position when said engagement portion is moved from said one to another of said pairs of engagement grooves upon said movable member being raised towards said raised position.

2. The adjustment/engagement device according to claim 1 further comprising biasing means for pivotally biasing said lock bracket means in said one direction and for pivotally biasing said lock-off bracket means in a direction to assist in said interengagement between said lock-off surface and said lock bracket means.

3. The adjustment/engagement device according to claim 2 wherein said biasing means includes a first spring extended between said lock means and said movable member and a second spring extended between said lock means and said lock-off mweans.

4. The adjustment/engagement device according to claim 3, wherein said first spring biases a rear half section of said lock means to normally bring it into contact with said engagement surfaces of said inverted U-shaped bracket, and wherein said second spring biases said lock means and said lock-off means so that both may be retentively engaged with each other in such a manner that a rear end of said lock means is opposingly positioned relative to an upper end of said lock-off means.

5. The adjustment/enagement device according to claim 1, wherein said upper engagement piece of said stopper bracket is horizontally positioned between said pair of position-determining members and projects from the upper edge portion of said stopper bracket, and wherein said second engagement piece of said stopper bracket is vertically positioned between said pair of position-determining members and projects upwardly from the lower edge portion of said stopper bracket.

6. The adjustment/engagement device according to claim 1, wherein said lock-off bracket means includes a substantially L-shaped bracket which defines a vertical section, a horizontal section and a bent section interposed between said vertical and horizontal sections, and wherein said bent section is located below said lock bracket means and is journalled to a top end portion of said inverted U-shaped bracket, said vertical section having an engagement edge engagable with a rear end portion of said lock means while said lock bracket is in said disengaged position, and said horizontal section has a projection piece which abuts against said upper engagement piece of said stopper bracket.

* * * * *